United States Patent
Liu

(10) Patent No.: US 8,490,222 B2
(45) Date of Patent: Jul. 23, 2013

(54) LOW-WATER-FLOW TOILETS AND LOW-WATER-FLOW URINALS

(71) Applicant: Tianjin Wanlu Limited Company of Science and Technology, Tianjin (CN)

(72) Inventor: Nianlu Liu, Tianjin (CN)

(73) Assignee: Tianjin Wanlu Limited Company of Science and Technology, Tianjin (CN)

( * ) Notice: Subject to any disclaimer, the term of this patent is extended or adjusted under 35 U.S.C. 154(b) by 0 days.

(21) Appl. No.: 13/631,822

(22) Filed: Sep. 28, 2012

(65) Prior Publication Data

US 2013/0025040 A1    Jan. 31, 2013

Related U.S. Application Data

(63) Continuation-in-part of application No. PCT/CN2011/000319, filed on Feb. 28, 2011.

(30) Foreign Application Priority Data

Mar. 30, 2010    (CN) .......................... 2010 1 0135415

(51) Int. Cl.
*E03D 13/00*    (2006.01)

(52) U.S. Cl.
USPC .................................................... 4/301; 4/434

(58) Field of Classification Search
USPC .................... 4/301, 311, 420, 434, 435, 437
See application file for complete search history.

(56) References Cited

U.S. PATENT DOCUMENTS 5,293,651 A * 3/1994 Johansson .................. 4/420
5,920,920 A * 7/1999 Chi ............................... 4/437

* cited by examiner

*Primary Examiner* — Tuan N Nguyen
(74) *Attorney, Agent, or Firm* — Matthias Scholl P.C.; Matthias Scholl

(57) ABSTRACT

A low-water-flow toilet having a toilet body, a funnel, a floating ball with a pull wire, water sealing structures, a toilet seat with a rotating shaft, an upper cover, and a plastic fender cover. The water sealing structures include an inner water sealing trap (11) of the toilet body, an outer water sealing trap (12) of the toilet body, a rotating groove arranged on the inner side of the inner water sealing trap (11), and a rotating groove arranged on an outer side of the outer water sealing trap (11). A low-water-flow urinal, having a urine storage bottle (18), a funnel having a water sealing trap (20), a floating ball with a pull wire and a pull ring (21), and an upper cover (23) of the urine storage bottle.

8 Claims, 15 Drawing Sheets

LOW-WATER-FLOW TOILETS AND LOW-WATER-FLOW URINALS

CROSS-REFERENCE TO RELATED APPLICATIONS

This application is a continuation-in-part of International Patent Application No. PCT/CN2011/000319 with an international filing date of Feb. 28, 2011, designating the United States, now pending, and further claims priority benefits to Chinese Patent Application No. 201010135415.1 filed Mar. 30, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a low-water-flow toilet and a law-water-flow urinal.

2. Description of the Related Art

Due to designs of bent pipes of sewers and water sealing traps of toilets, conventional toilets having a cistern cannot be washed down thoroughly with less water and left no smell. About 3 L water from the cistern is required to wash down the toilets. Insufficient flush water or slower flow rate cannot achieve the effect of thorough flush but just dilutes the urine. Furthermore, conventional toilet covers and the toilets are not in tight fit, and incomplete flush will surely produce smells. The common toilet is lower than the urinal in the public restroom, thus causing contamination of the toilet seat due to easy spatter of urine outside. The toilet in the family bathroom is often washed with water which has been used to wash clothes, vegetables and the like, but need to be flushed with water in the cistern of the toilet when the stored water is insufficient. People need a low-water-flow toilet which is convenient to use, odor-free, low in price and can be washed down just with little water.

SUMMARY OF THE INVENTION

In view of the above-described problems, it is one objective of the invention to provide a low-water-flow toilet and a low-water-flow urinal.

To achieve the above objective, in accordance with one embodiment of the invention, there is provided a low-water-tow toilet comprising: a toilet body comprising a lifting handle; a funnel comprising a lifting handle; a floating ball comprising a pull wire and a pull ring; a toilet seat comprising a rotating shaft; an upper cover comprising a rotating shaft; a fender cover; a nut of the rotating shaft of the toilet seat; and a nut of the rotating shaft of the upper cover.

As shown in FIGS. 3-7, 10, an upper end of the toilet body is provided with an inner water sealing trap of the toilet body and an outer water sealing trap of the toilet body. A rotating groove which protrudes inwards and matches with two ends of the rotating shaft of the toilet seat is arranged on one end of an inner side of the inner water sealing trap. A top face of the rotating groove has the same height as the top face of the outer water sealing trap. A lower end of the rotating groove is connected with the bottom part of the inner water sealing trap to be as a whole.

The position where a vertical face of an upper end outside the outer water sealing trap is adjacent to the rotating groove matching with two ends of the rotating shaft of the toilet seat is provided with a rotating groove which protrudes outwards and matches with two ends of the rotating shaft of the upper cover. A top face of the rotating groove has the same height as the top face of the outer water sealing trap. A bottom face of the rotating groove is even with the plane of the upper cover below the rotating shaft of the upper cover when the upper cover is closed. Two through holes are opened on the toilet body at a left lower side of the rotating shaft of the toilet seat. Two through holes are arranged on the toilet body below the rotating shaft of the upper cover, and two sides of the upper part of the toilet body are provided with two through holes and equipped with the lifting handle of the toilet body. The upper end of the toilet body is sleeved with the funnel with the lifting handle of the funnel. The funnel is lowered gradually from an inner wall of the toilet body to a lower exit of the funnel. An inner space of the funnel exit is a truncated cone having a bigger upper and small lower, which has slope. The top face of the funnel sleeved on the inner wall of the toilet body has the same height as the top face of the outer water sealing trap. The outer edge of an upper end of the funnel is sleeved in the inner water sealing trap and closed by water stored in the inner water sealing trap of the toilet body to prevent the escape of odors from within the toilet.

As shown in FIGS. 5-6, the lifting handle of the funnel is placed in the inner water sealing trap. A diameter of the floating ball with the pull wire is larger than an inner diameter of an end of the lower exit of the funnel. The floating ball arranged at the lower exit inside the funnel is in an empty structure and can be made of glass. The top part of the floating ball is provided with a lifting lug to which a nylon pull wire is tied. The nylon pull wire runs through the top face of the funnel and the top face of the outer water sealing trap. Another end of the nylon pull wire is tied with the pull ring of the floating ball which has a smaller weight than that of the floating ball with the pull wire. The pull ring of the floating ball with the pull wire is suspended below the outer water sealing trap. The lower exit of the funnel is positioned at a lowest position of the funnel, and the floating ball will surely fall back to the lower exit of the funnel every time the floating ball floats under the traction of the pull wire.

As shown in FIG. 10, the inner space where the small floating ball falls to the funnel exit is a truncated cone-shaped middle part with a big upper part and a small lower part, which has slope, and has remarkable water sealing effect. The toilet seat is covered on a top of the inner water sealing trap. The rotating shaft of the toilet seat matching with the toilet seat is fixed in the rotating groove of the rotating shaft of the toilet seat by the nut of rotating shaft of the toilet seats at two ends of the rotating shaft of the toilet seat. A nylon wire runs through two through holes arranged on the toilet body at the left lower side of the rotating shaft of the toilet seat to tighten two ends of the rotating shaft of the toilet seat for a second fixing. The upper cover is covered on a top part of the toilet seat. The rotating shaft of the upper cover matching with the upper cover is fixed in the rotating groove of the rotating shaft of the upper cover by the nut of rotating shaft of the upper cover at two ends of the rotating shaft of the upper cover. A nylon wire runs through two through holes arranged on the toilet body below the rotating shaft of the upper cover to tighten two ends of the rotating shaft of the upper cover for a second fixing. The top part of the funnel sleeved on the toilet body and an inner upper edge aperture of the outer water sealing trap is a main supporting part when the toilet seat is stressed. The rotating groove and the nut of rotating shaft of the toilet seat matching with the two ends of the rotating shaft of the toilet seat plays a role of partial supporting when the toilet seat is stressed. The toilet seat rotating around the rotating shaft of the toilet seat as an axis can rotate from a horizontal state to a vertical state freely, and is limited to move toward other directions except for the movement from the horizontal state to the vertical state. The upper cover rotating around the rotating shaft of the upper cover as an axis can be freely opened or closed as required when rotating from the horizontal state to the vertical state.

As shown in FIGS. 1-2, an included angle of the upper cover formed by a plane below the rotating shaft of the upper cover and the adjacent vertical face outside the outer water sealing trap is a fillet. A circle center of the fillet is a circle center of the rotating shaft of the upper cover, and an arc of the radial of the fillet is tangent to the included angle. As shown in FIG. 1, a cover edge of the upper cover at a position where the cover edge of the upper cover protruded downwards has a shortest distance from the rotating shaft of the upper cover does not touch two walls of the inner side of the outer water sealing trap during rotation of the upper cover, and other parts of the cover edge of the upper over can be smoothly inserted into the outer water sealing trap due to the increase of the rotation radial of the cover edge of the upper cover of the other parts. When the upper cover stays in a closed state as shown in FIGS. 1-2, the cover edge of the upper cover protruded downwards is inserted into the outer water sealing trap and sealed by water stored in the outer water sealing trap, thereby achieving the purpose of secondly preventing and sealing smells of the toilet.

In a class of this embodiment, to prevent urine and flush water accumulated in the toilet from entering into the inner water sealing trap and the outer water sealing trap and reduce flush water during pouring, a plastic fender cover is made, as shown in FIGS. 8-9. The plastic fender cover is semi-circular, and can cover the inner water sealing trap and the outer water sealing trap at one end of the toilet body. The fender cover is provided with a slot having a slope and a shape matching with those of the upper part of the toilet body. The upper cover and the toilet seat are sequentially opened during water pouring. The funnel, the floating ball, the pull wire, and the pull ring are lifted out of the toilet using the lifting handle of the funnel. The plastic fender cover is sleeved on the opposite of the rotating shaft of the upper cover, and firmly pushing the fender cover can result in tight connection between the fender cover and a contact face of the upper part of the toilet body, thereby effectively preventing liquid in the toilet from entering into the inner water sealing trap and the outer water sealing trap during pouring.

In accordance with another embodiment of the invention, there is provided a low-water-flow urinal for men adopting the characteristic design of the low-water-flow toilet comprising the toilet body with the water sealing traps, the funnel, the floating ball, pull wire, and the pull ring of the floating ball as shown in FIG. 11. The low-water-flow urinal for man comprises a urine storage bottle made of plastic material, a bottle mouth communicating vessel, a funnel having a water sealing trap, a floating ball, pull wire and pull ring, and an upper cover of the urine storage bottle. The urine storage bottle is arranged in a lower part. The bottle mouth communicating vessel connects the urine storage bottle with the funnel having the water sealing trap, and an upper part of the funnel having the water sealing trap is made into an upper semicircular opening and a lower semicircular opening having different heights and with the central line of the funnel having the water sealing trap as the boundary. The integral bottle mouth communicating vessel shown in FIG. 13 directly connecting the funnel having the water sealing trap and the urine storage bottle can be integrally made of plastic material. The bottle mouth communicating vessel shown in FIG. 13 is structurally characterized by a vertically-through sleeve pipe. Two ends of the inner wall of the sleeve pipe are provided with internal threads. Two ends of the inner middle position of the sleeve pipe are provided with sealing grooves matching with the bottle mouth. The funnel having the water sealing trap and an outer side of the bottle mouth of the urine storage bottle are provided with external threads matching with the bottle mouth communicating vessel, and the end face of the bottle mouth is inserted into the sealing groove to be in non-leakage connection with the bottle mouth communicating vessel after the bottle mouth communicating vessel is screwed tightly with the bottle mouth.

The floating ball connected with the pull ring and pull wire has a larger diameter than an inner diameter of the bottle mouth communicating vessel for water passing through, and a nylon pull wire connects the floating ball and the pull ring of the floating ball. The floating ball put at a lower exit inside the funnel having a water sealing trap is in a hollow structure and can be made of glass. A top part of the floating ball is provided with a lifting lug and tied with a nylon pull wire. The nylon pull wire runs across a top face of the water sealing trap at an upper end of the funnel having a water sealing trap, another end of the nylon pull wire is tied with the pull ring of the floating ball which has a smaller weight than that of the floating ball. The pull ring is suspended below the water sealing trap of the funnel having the water sealing trap. The cover edge of the upper cover of the urine storage bottle is inserted into the water sealing trap of the funnel having a water sealing trap and sealed by water stored in the water sealing trap.

In a class of this embodiment, a bottle cover communicating vessel, as shown in FIGS. 14-15, is a matching structure comprising a sleeve pipe with an internal thread and a sleeve pipe with an external thread. The bottle cover communicating vessel comprises a vertically-through sleeve pipe with an internal thread at one end and a vertically-through sleeve pipe with an external thread at one end matching with the thread of the internal thread sleeve pipe. The internal thread sleeve pipe has the same outer diameter as that of the unthreaded part of the external thread sleeve pipe. The unthreaded ends of the internal thread sleeve pipe and the external thread sleeve pipe are provided with two through holes respectively for tightening the bottle cover communicating vessel. The central positions of two common plastic bottle covers are made into two round holes with the same outer diameters as the thread of the external thread sleeve pipe, and with the two bottle cover planes attached to each other. The two bottle covers are sleeved on the external thread sleeve pipe of the bottle cover communicating vessel, and after the internal thread sleeve pipe is coordinately tightened with the external thread sleeve pipe, both the bottle covers sleeved on the external thread sleeve pipe are tightly connected under the pressure of the end face of the internal thread sleeve pipe and the end face of the unthreaded middle protrusion of the external thread sleeve; and the combined body can replace the bottle mouth communicating vessel to connect the urine storage bottle and the funnel having a water sealing trap.

A low-water-flow urinal shown in FIG. 12 is made of plastic material, the funnel having a water sealing trap and the urine storage bottle are processed into a combined part using a plastic processing device. The upper port of the water sealing trap of the combined part of the funnel having a water sealing trap and the urine storage bottle is made into an upper semicircular opening and a lower semicircular opening having different heights and with the central line of the combined part as the boundary. The combined part of the funnel having a water sealing trap and the urine storage bottle can replace the combined body of the funnel having a water sealing trap and the urine storage bottle which are connected by the bottle mouth communicating vessel. The diameter of the floating ball connected with the pull ring and pull wire is larger than the inner diameter of the bottle mouth part of the combined part of the funnel having a water sealing trap and the urine storage bottle, and the nylon pull wire connects the floating ball and the floating pull ring. The floating ball arranged at the upper end of the bottle mouth part of the combined part of the funnel having a water sealing trap and the urine storage bottle is in a hollow structure. The floating ball can be made of glass, and the top part of the floating ball is provided with a lifting lug and tied with the nylon pull wire. The nylon pull wire runs across the top face of the water sealing trap in the combined part of the funnel having a water sealing trap and the urine storage bottle. The other end of the nylon pull ring is tied with the floating pull ring which has smaller weight than that of the floating ball. The pull ring is suspended below the water sealing trap of the combined part of the funnel having a water sealing trap and the urine storage bottle. The cover edge of the upper cover of the urine storage bottle is inserted into the water sealing trap of the combined part of the funnel having a water sealing trap and the urine storage bottle and sealed by water stored in the water sealing trap.

In a class of this embodiment, the low-water-flow toilet has the structural characteristics of the toilet body, the funnel, the floating ball with the pull wire, the pull ring of the floating ball, the toilet seat, the rotating shaft of the toilet seat, the upper cover, the rotating shaft of the upper cover, the nut of rotating shaft of the toilet seats and the rotating shaft of the upper cover nuts. The fixed toilet is designed according to the structural characteristics and the tight fit mode. The lower exit of the conventional fixed toilet is changed into a circular lower exit. The inner space of the exit is a truncated cone with a big upper and a small lower and has slope. The vertex of the water sealing trap of the conventional toilet is designed at the position when the floating ball matches with the circular lower exit, and the highest level of water stored in the toilet water sealing bend should be lower than the lowest point of the floating ball when the floating toilet matches with the lower exit of the toilet to guarantee the water sealing between the floating ball and the lower exit. The upper end of the traditional toilet is additionally provided with a water sealing trap matching with the cover edge of the upper cover. A rotating groove matching with the rotating shaft of the upper cover is arranged outside the water sealing trap. A rotating groove matching with the rotating shaft of the toilet seat is arranged at the position in the toilet upper cover adjacent to the rotating shaft of the upper cover. Thus, the purposes of water saving and smell prevention are achieved by the floating ball with the pull wire, the floating pull ring, the toilet seat, the rotating shaft of the toilet seat and nuts, the upper cover, the rotating shaft of the upper cover and nuts match with the toilet body of the improved fixed toilet. When the improved fixed low-water-flow toilet stays in the closed state, the protruded-downwards cover edge of the toilet upper cover on the toilet seat is inserted into the toilet water sealing trap and sealed by water stored in the water sealing trap. The toilet upper cover and the toilet seat can be opened and closed freely when rotating from the horizontal state to the vertical state. The toilet body of the improved fixed toilet is still made of porcelain material or hard plastic material.

Advantages of the invention are summarized below. The low-water-flow toilet and the low-water-flow urinal for men achieve the purpose of water saving under the condition of preventing leakage of smells, only have urine of 1 mL or so left on the funnel and the floating ball after flushing of urine based on a plurality of test analyses, and most of the urine is sealed and stored in the urine storage bottle. A common beverage bottle of 500 mL volume is burned or drilled with a small hole with the diameter of phi 3 mm at the center of the bottle cover, and is filled with water, and then the bottle cover is screwed on; squeezing the bottle body can spray the water to 4-5 meters. The funnel and the floating ball can be washed down thoroughly with 50-100 mL water squeezed from the beverage bottle with one or a plurality of small holes, and putting the upper cover of the toilet in place can totally eliminate smells under the condition of no water for washing; the floating ball and nylon pull wire. The pull ring and the bottle mouth communicating vessel have low production cost, three 5 L square-shaped empty oil drums or 2.5 L waste big beverage bottles can be changed into a urinal without a water sealing trap, two of the oil drums or beverage bottles are used as the urine storage bottle and the funnel, and the other is used as the funnel upper cover, and better effect can be achieved using the bottle mouth communicating vessel and the floating ball. The low-water-flow toilet can save 0.5 billion tons of water annually if one family saves one ton of water and 10 percent of the families in China use the low-water-flow toilet. In addition, the low-water-flow toilet solves the problem of emergent urination when there is only one toilet in a house.

BRIEF DESCRIPTION OF THE DRAWINGS

The invention is described hereinbelow with reference to accompanying drawings, in which.

Figure 1:
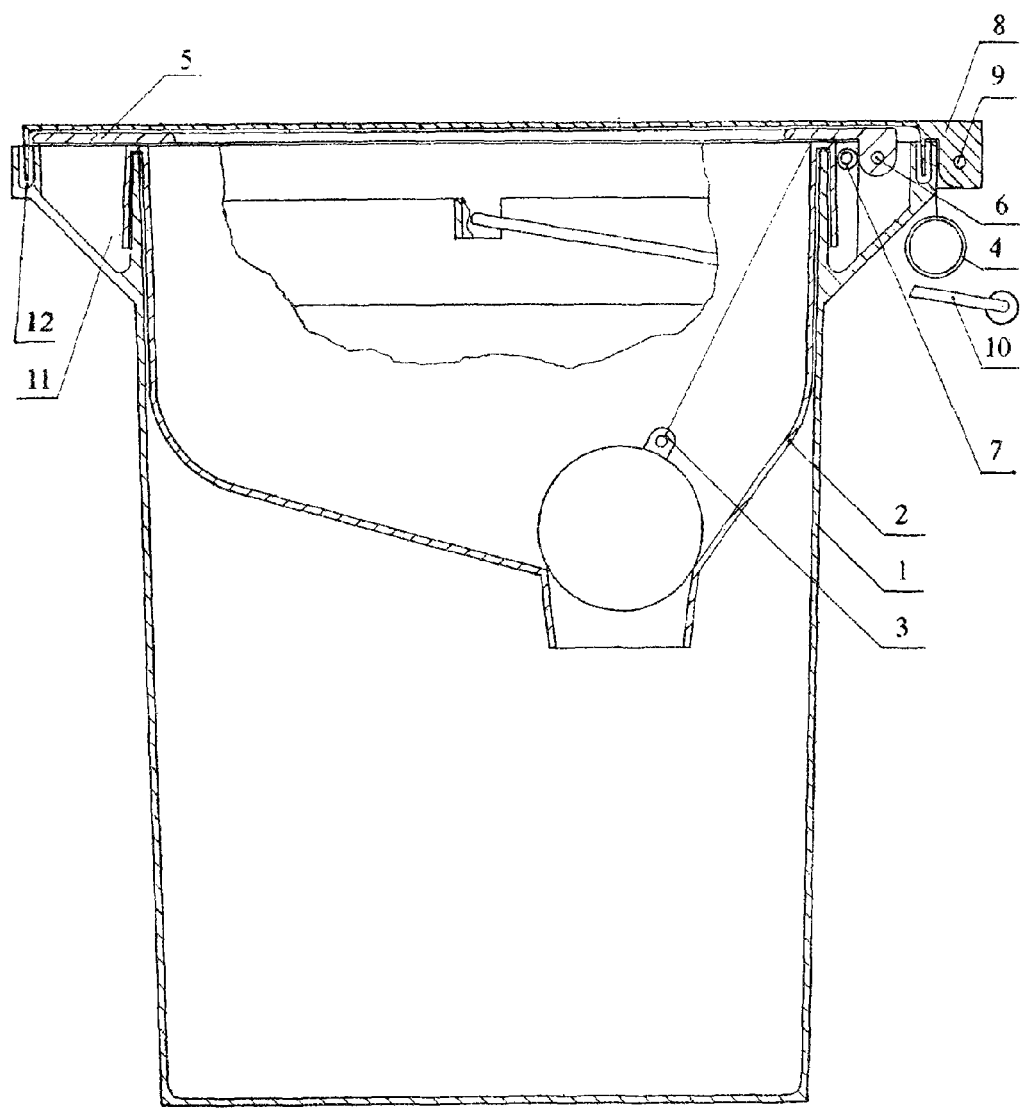
FIG. 1 is a sectional view of a front view of a low-water-flow toilet in accordance with one embodiment of the invention.
Figure 2:
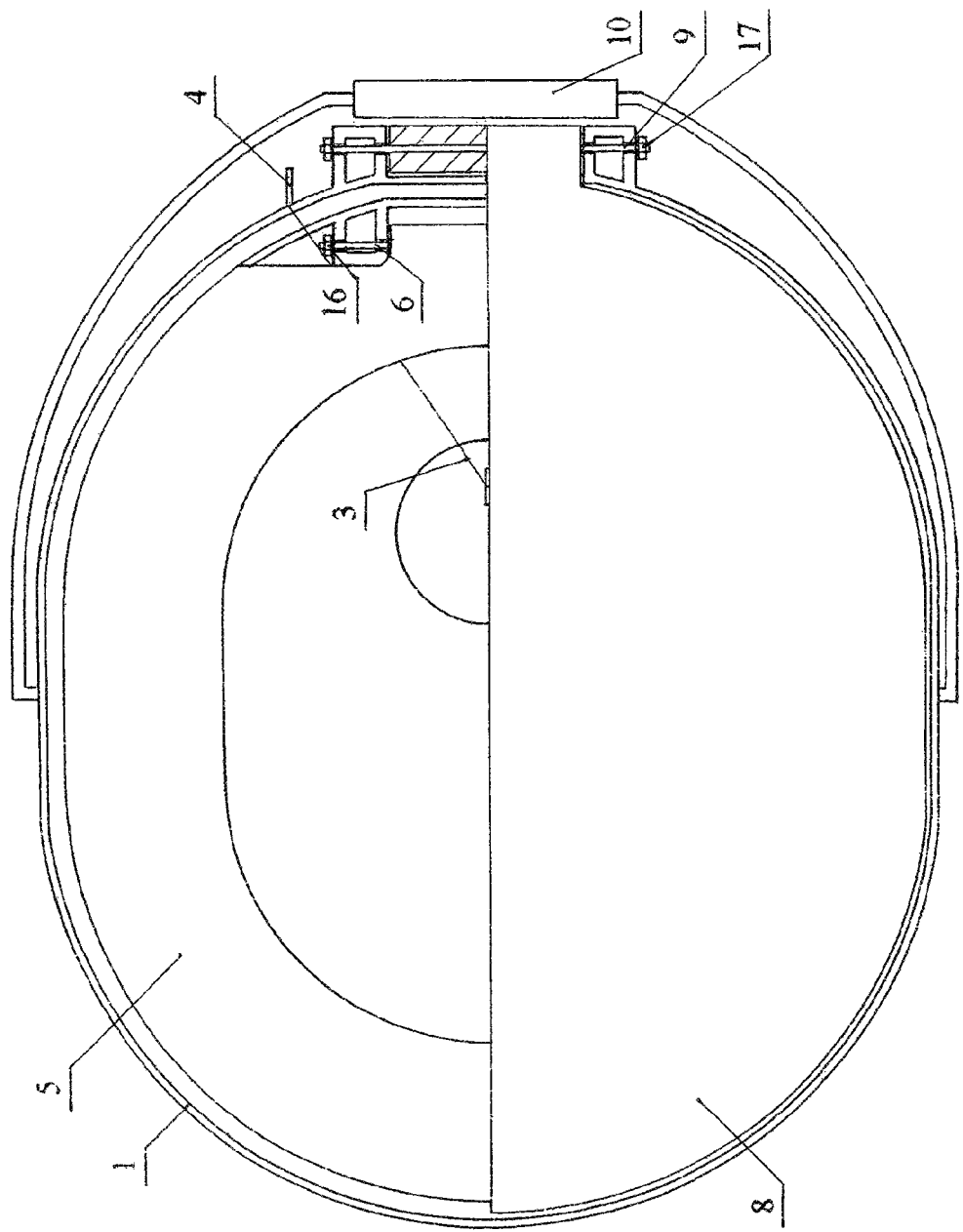
FIG. 2 is a sectional view of a top view of a low-water-flow toilet in accordance with one embodiment of the invention.
Figure 3:
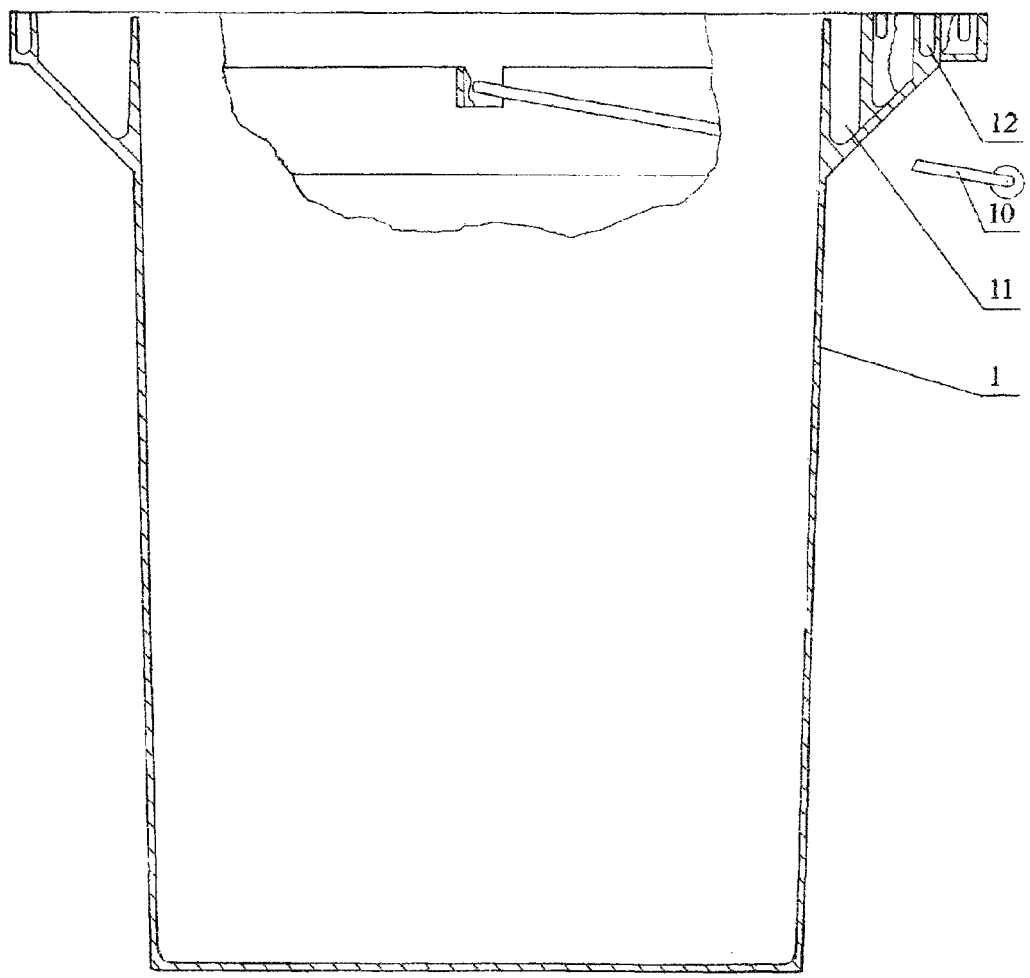
FIG. 3 is a sectional view of a front view of a toilet body in accordance with one embodiment of the invention.
Figure 4:
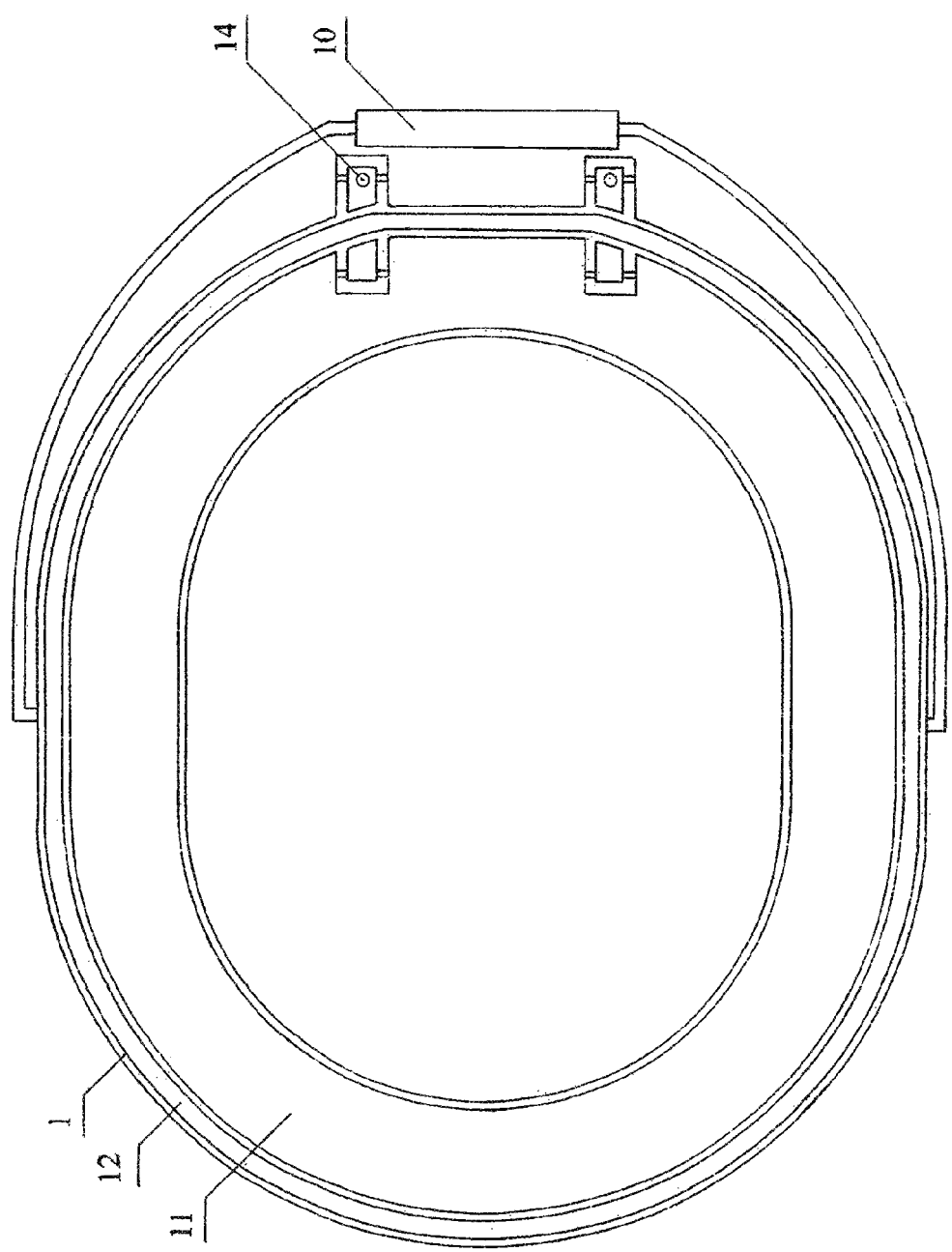
FIG. 4 is a top view of a toilet body in accordance with one embodiment of the invention.
Figure 5:
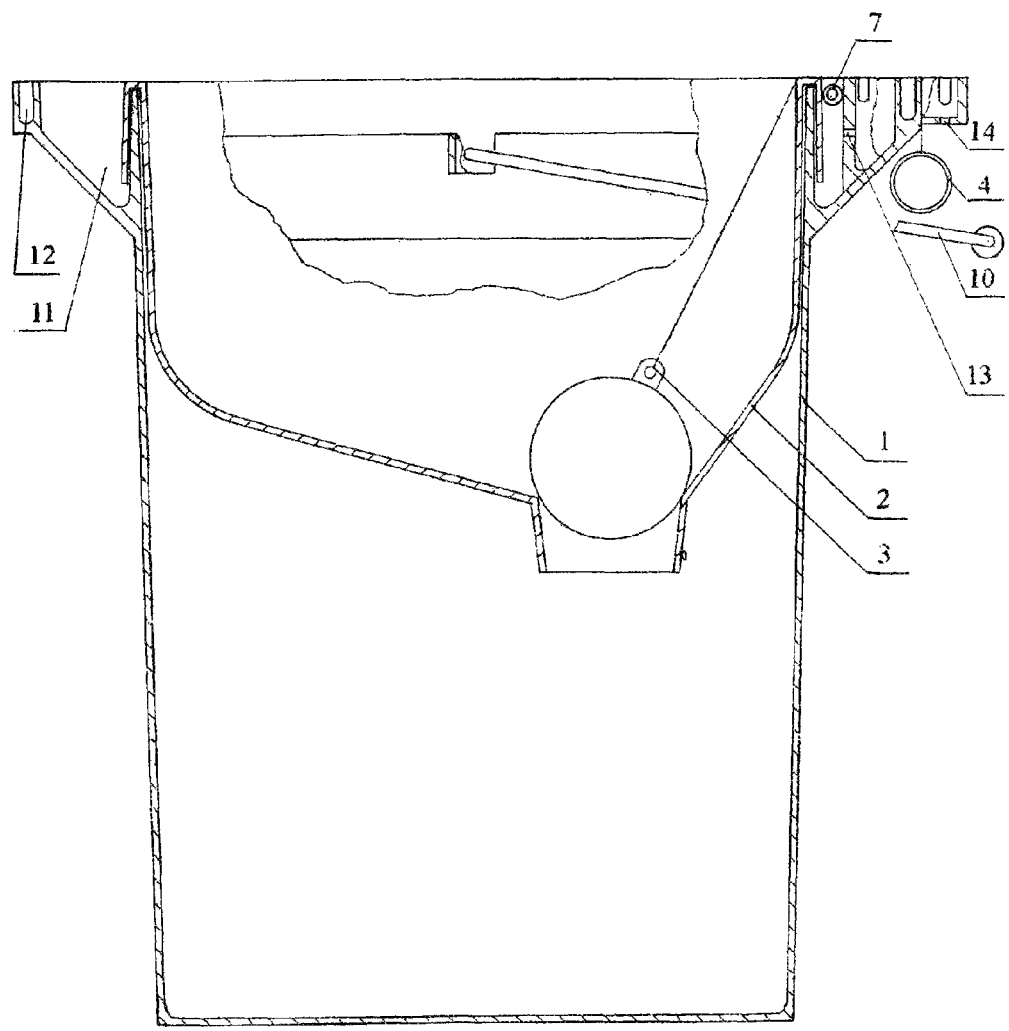
FIG. 5 is a sectional view of a front view of a funnel and a floating ball sleeved on a toilet body in accordance with one embodiment of the invention.
Figure 6:
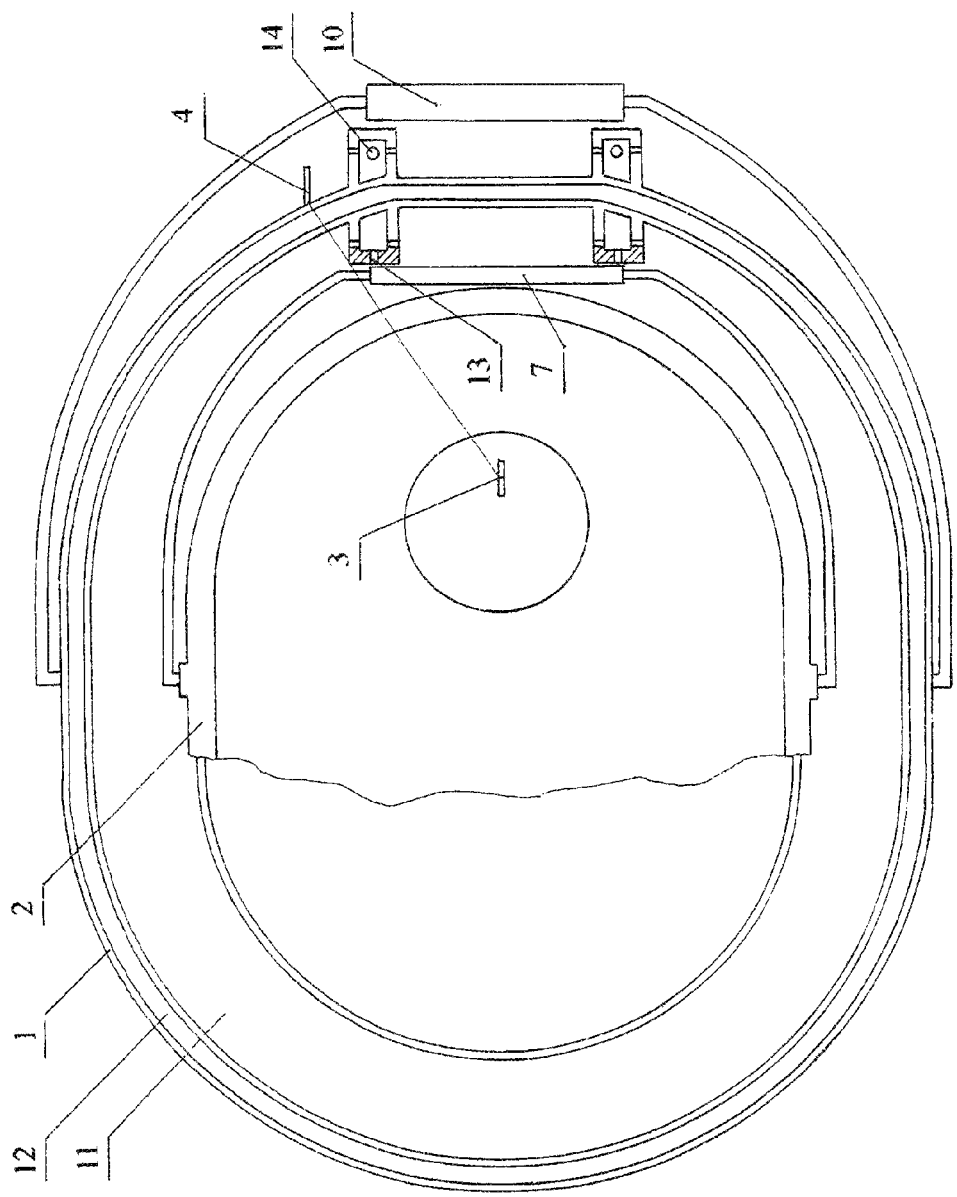
FIG. 6 is a top view of a funnel and a floating ball sleeved on a toilet body in accordance with one embodiment of the invention.
Figure 7:
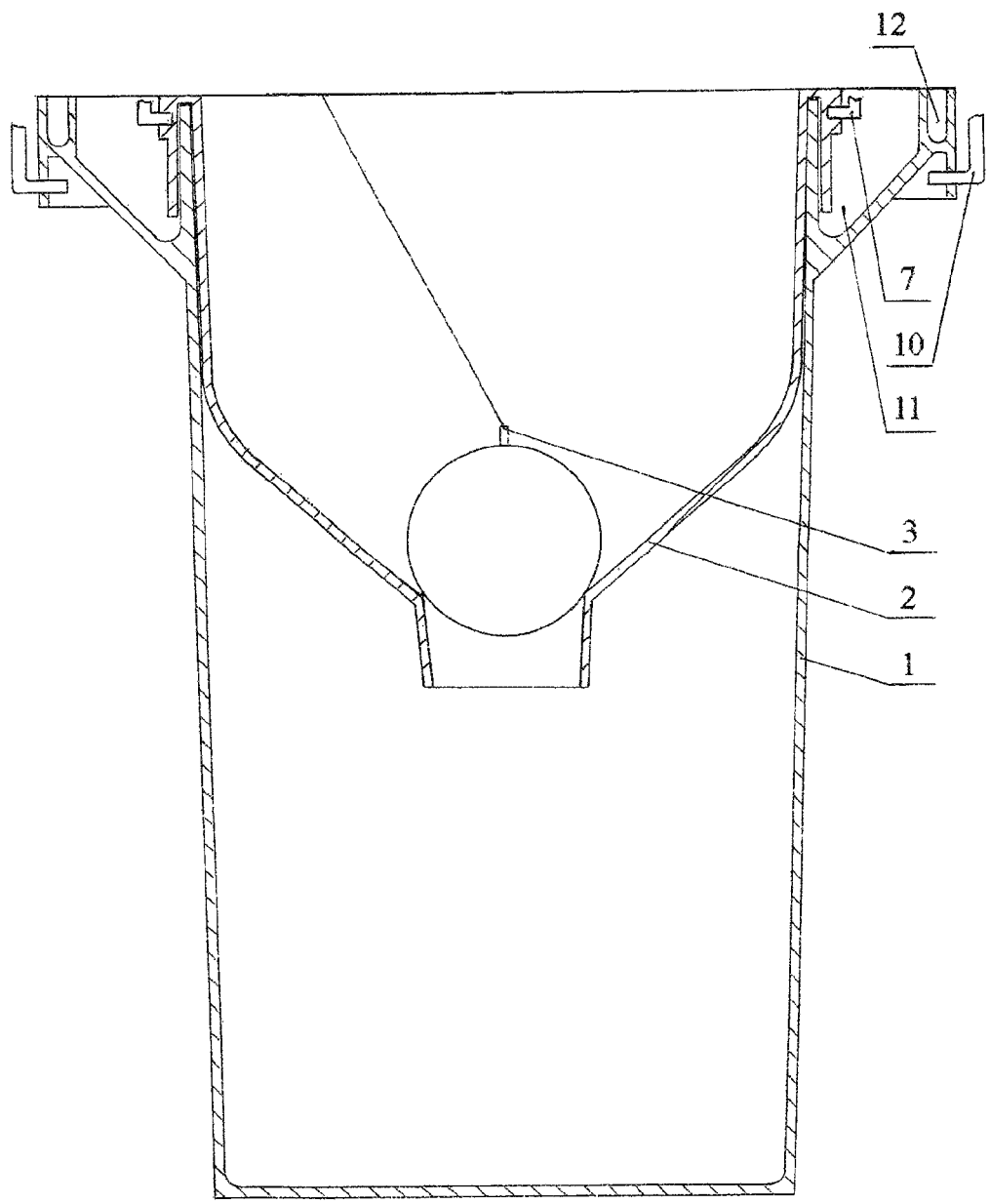
FIG. 7 is a sectional view of a left view of a funnel and a floating ball sleeved on a toilet body in accordance with one embodiment of the invention.
Figure 8:
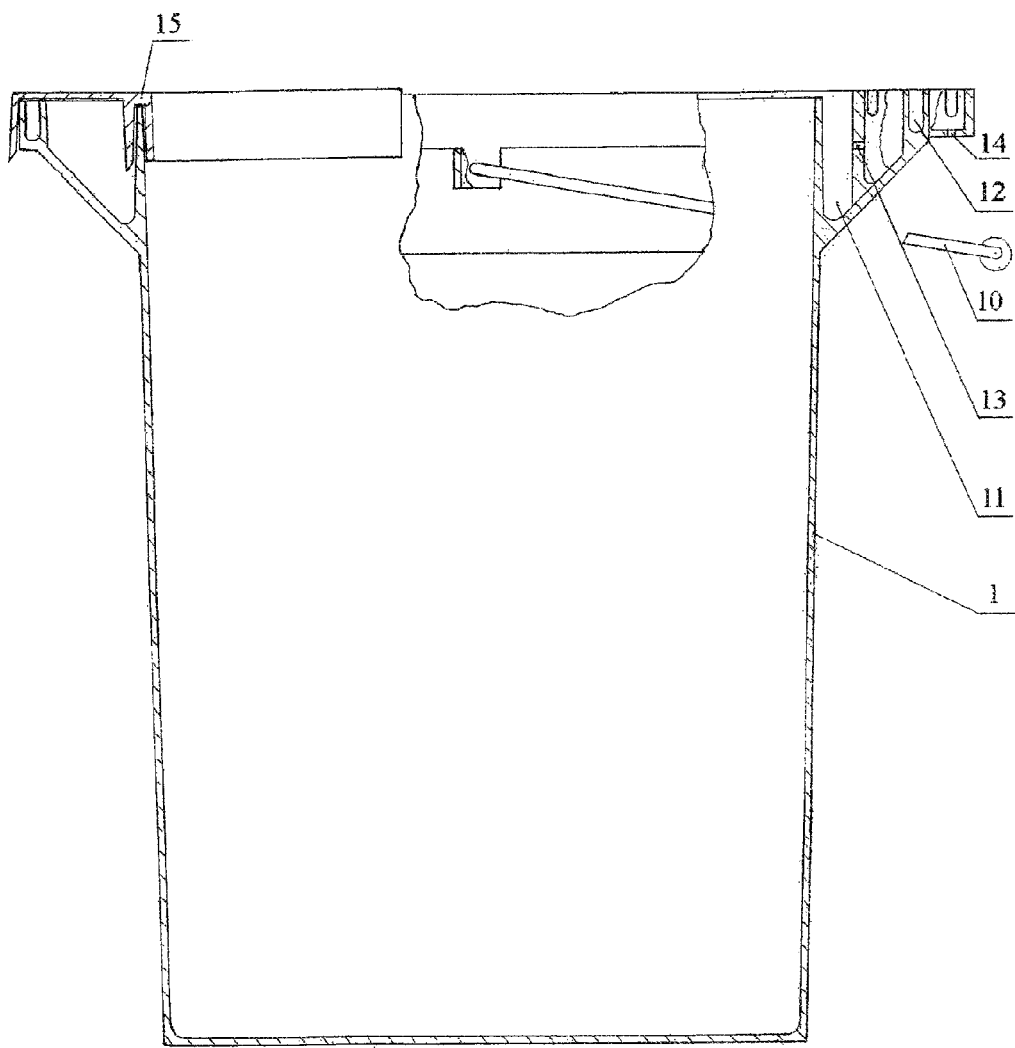
FIG. 8 is a sectional view of a front view of a fender cover sleeved on a toilet body in accordance with one embodiment of the invention.
Figure 9:
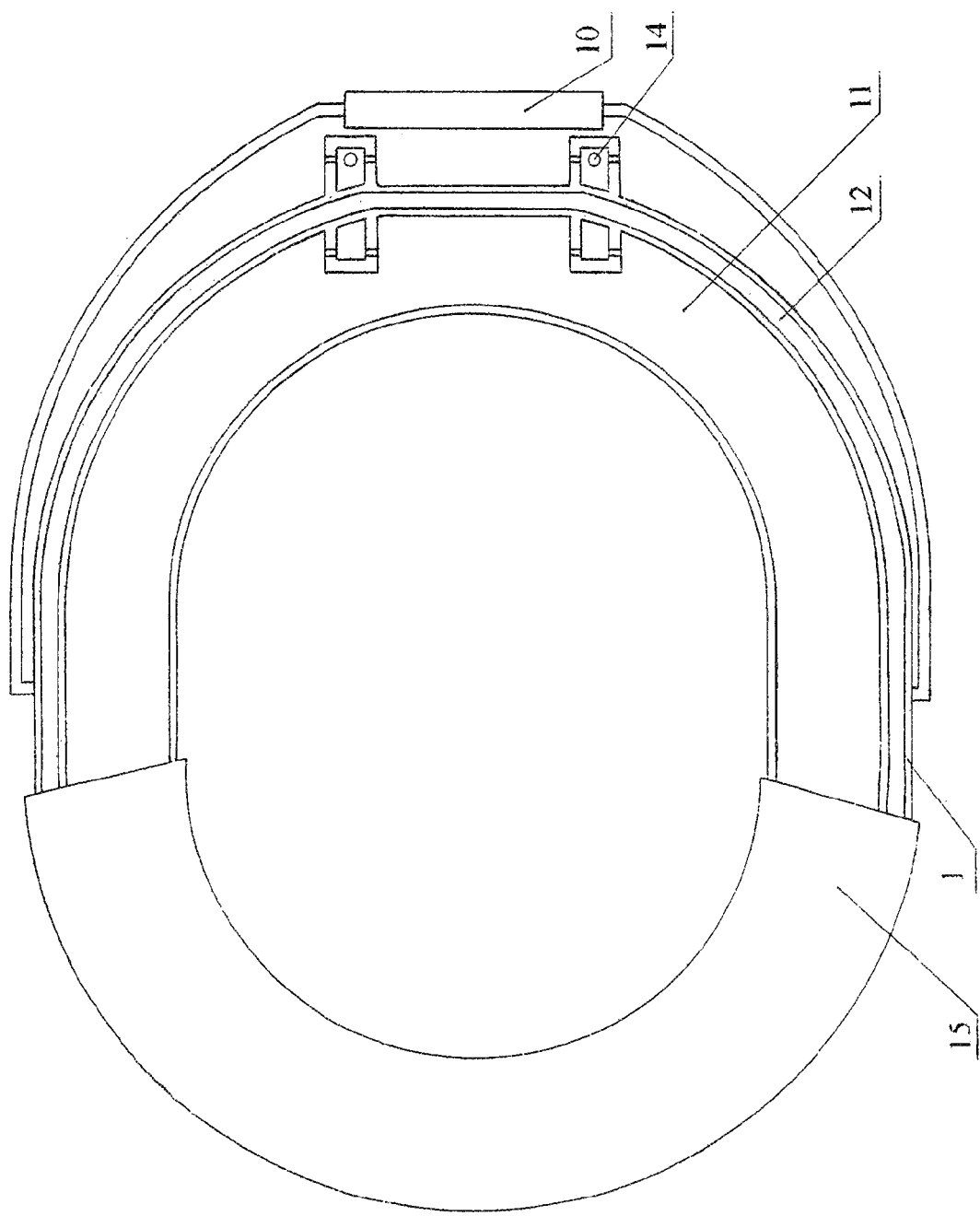
FIG. 9 is a top view of a fender cover sleeved on a toilet body in accordance with one embodiment of the invention.
Figure 10:
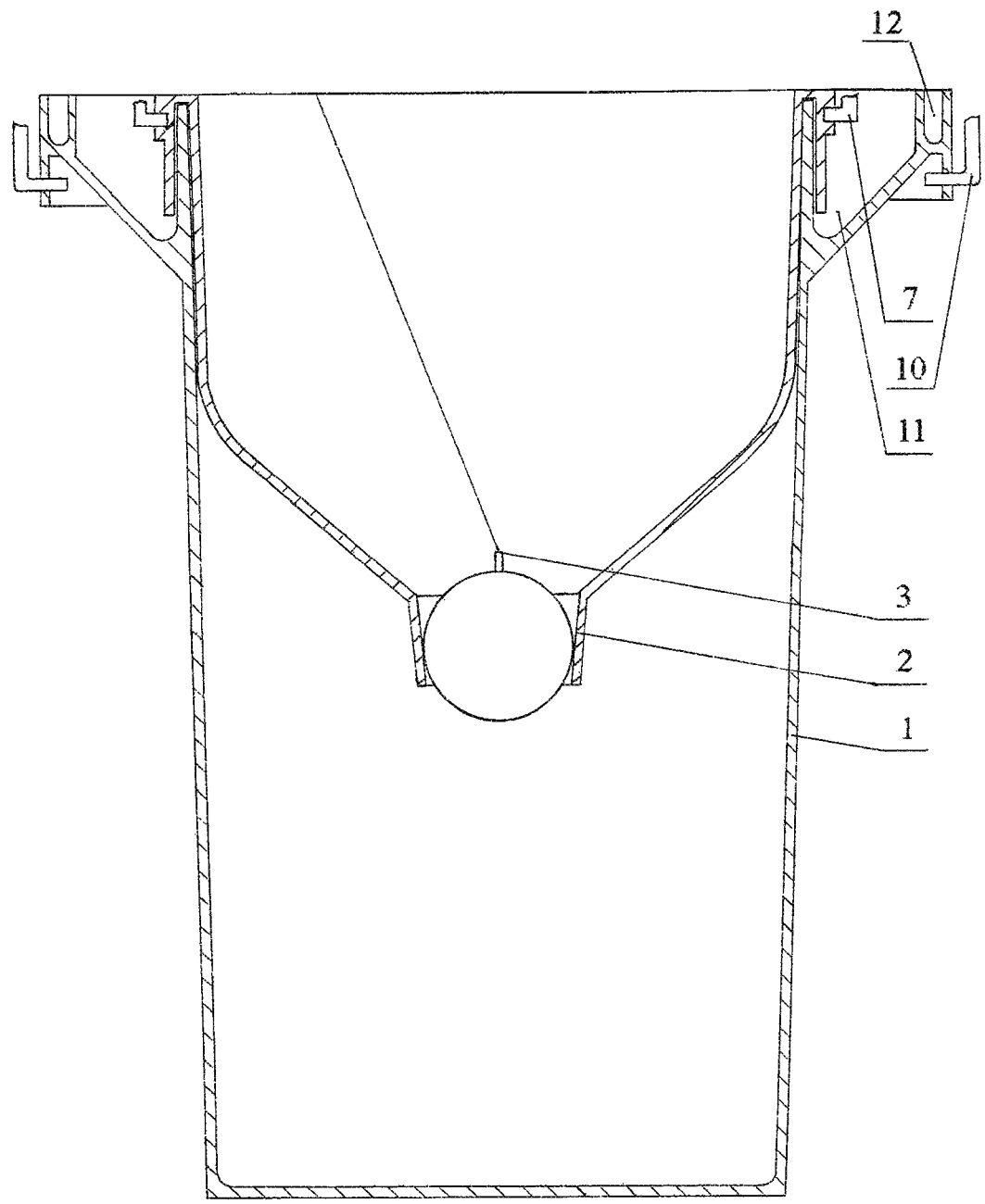
FIG. 10 is a sectional view of a left view of a funnel and a floating ball sleeved on a toilet body in accordance with one embodiment of the invention.
Figure 11:
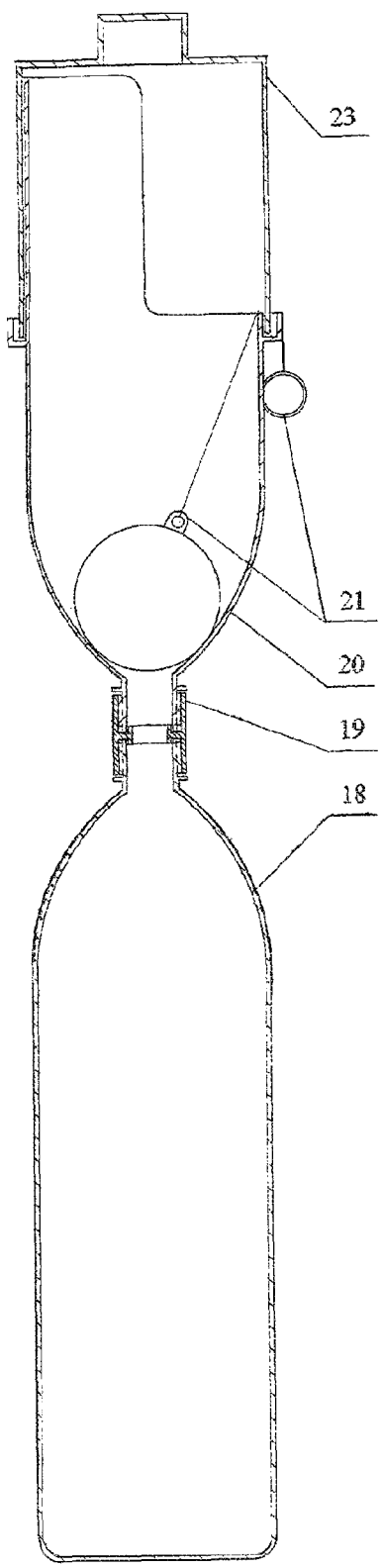
FIG. 11 is a sectional view of a low-water-flow urinal for men connected with a bottle mouth communicating vessel in accordance with one embodiment of the invention.
Figure 12:
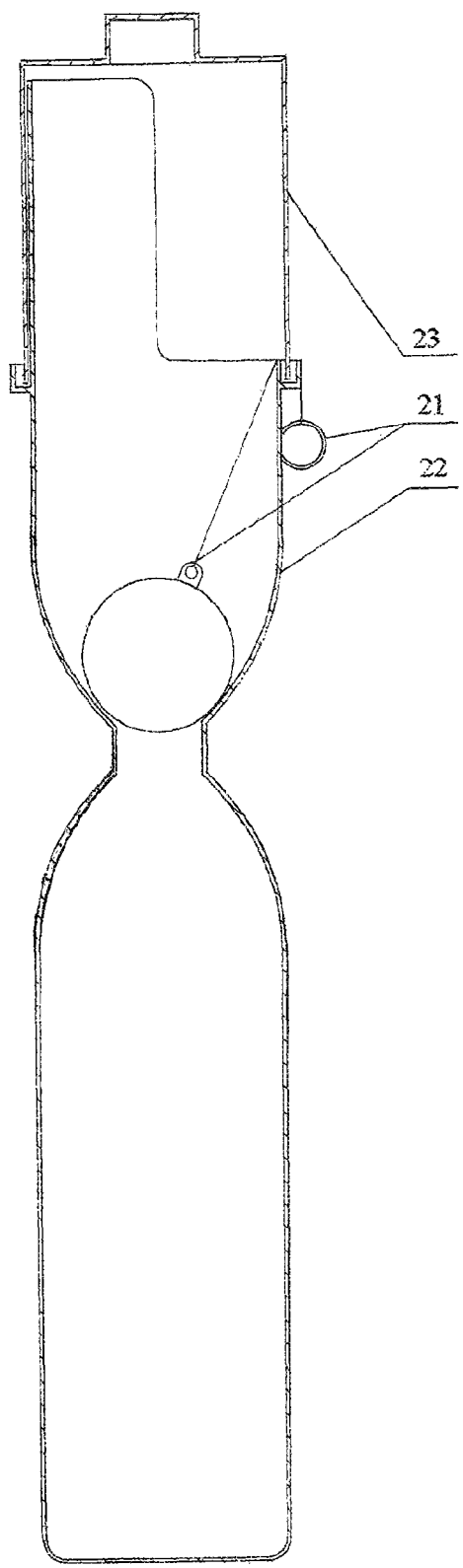
FIG. 12 is a sectional view of a low-water-flow urinal for men having a combined part of the funnel having a water sealing trap and the urine storage bottle in accordance with one embodiment of the invention.
Figure 13:
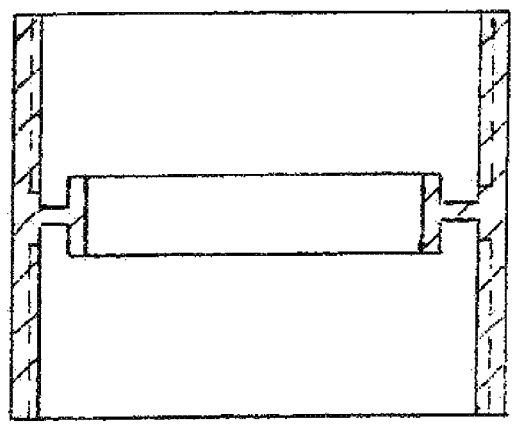
FIG. 13 is an enlarged view of a bottle mouth communicating vessel of FIG. 11.
Figure 14:
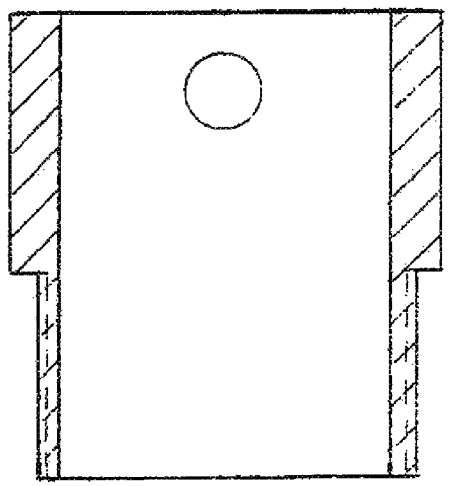
FIG. 14 is a sectional view of a bottle cover communicating vessel having a sleeve pipe with an external thread in accordance with one embodiment of the invention.
Figure 15:
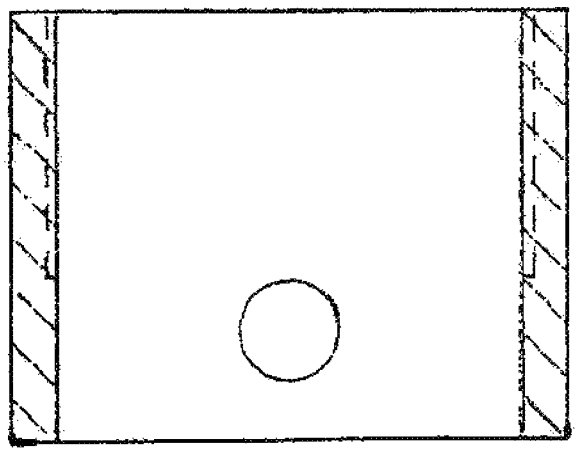
FIG. 15 is a sectional view of a bottle cover communicating vessel having a sleeve pipe with an internal thread in accordance with one embodiment of the invention.

In the drawings, the following reference numbers are used: 1. Toilet body; 2. Funnel; 3. Floating ball and pull wire; 4. Pull ring of floating ball; 5. Toilet seat; 6. Rotating shaft of toilet seat; 7. Lifting handle of funnel; 8. Upper cover; 9. Rotating shaft of upper cover; 10. Lifting handle of toilet body; 11. Inner water sealing trap of toilet body; 12. Outer water sealing trap of toilet body; 13. Through hole opened on toilet body at left lower side of rotating shaft of toilet seat; 14. Through hole opened on toilet body below rotating shaft of upper cover; 15. Fender cover; 16. Nut of rotating shaft of toilet seat; 17. Nut of rotating shaft of upper cover; 18. Urine storage bottle; 19. Bottle mouth communicating vessel; 20. Funnel having a water sealing trap; 21. Floating ball with pull wire and pull ring; 22. Combined part of funnel having a water sealing trap and urine storage bottle; and 23. Upper cover of urine storage bottle.

DETAILED DESCRIPTION OF THE EMBODIMENTS

For further illustrating the invention, experiments detailing a low-water-flow toilet and a low-water-flow urinal for men are described below. It should be noted that the following examples are intended to describe and not to limit the invention.

The shape, structure, and weight characteristics of components of a low-water-flow toilet are described as follows. A toilet body 1 is sleeved with a funnel 2. The toilet body 1 can hold 5-20 L liquid under the condition that a floating ball in a floating ball with a pull wire 3 floats on the liquid stored in the toilet body below the lower exit of the funnel 2. Repeated tests prove that the inner space at the lower exit of the funnel 2 is a truncated cone with a big upper and a small lower and has the slope of 1-5 degrees, and is in tight fit with the floating ball in the floating ball with the pull wire 3, and the contact face of both has the diameter of phi 60 mm. After the floating ball in the floating ball with the pull wire 3 falls freely, 3-9 drips of water (about 1-3 mL) are trickled in to form a water sealing layer of 12-15 mm high, and the complete water sealing layer of 8 mm can be visually, clearly remained after 48 hours, thereby achieving the effect of preventing the leakage of smells under the state of normal pressure. The floating ball with the diameter of phi 60 mm-phi 70 mm and the weight of 30-50 g matches with the lower exit of the funnel 2. The floating ball in the floating ball with the pull wire 3 floats after water is poured in with a certain amount remained, and falls when water runs off completely. When the inner space stays in the static state without leakage, water is slowly poured in and the inner space can hold 4-10 mL water, and increasing the weight of the floating ball can increase the volume of accumulated water. The outer water sealing trap 12 is poured with water till 10 mm high, which is only about 60 mL, and pouring water into the inner water sealing trap 11 till 10-20 mm high can achieve the expected effect.

In a bottle mouth communicating vessel 19 of the low-water-flow urinal for men, its inner diameter for water passing through is compared by water tests within the range of phi 14 mm-phi 38 mm: a 2.5 L empty beverage bottle is utilized, a bottle cover communicating vessel with the inner diameter of phi 14 mm is taken for tests, and completely pouring out 2.5 L of water from the bottle mouth with the inner diameter of phi 14 mm needs 80 seconds, 30 seconds from the bottle mouth with the inner diameter of phi 20.4 mm, and only 7 seconds from the bottle mouth with the inner diameter of phi 38 mm. According to the tests, to reduce the water pouring time, the inner diameter of the bottle mouth communicating vessel 19 for water passing through and the bottle mouth part in the combined part 22 of the urine storage bottle and the funnel having a water sealing trap should approach or be up to 38 mm. The low-water-flow urinal for men can be adjusted the placement or hanging height according to the height of users.

The toilet body 1 of the low-water-flow toilet with 2-3 mm wall thickness made of hard plastic has the entire weight of about 2 kg together with other components, totally satisfying the strength requirement for normal use, and alternatively, the toilet body 1 can be made of stainless steel sheets. The funnel 2, the floating ball in the floating ball with the pull wire 3, a toilet seat 5, an upper cover 8, a fender cover 15, a urine storage bottle 18, the bottle mouth communicating vessel 19, the funnel 20 with a water sealing trap, the combined part 22 of the funnel having a water sealing trap and the urine storage bottle, the upper cover 23 of the urine storage bottle and the floating ball in the floating ball, the pull wire and pull ring 21 can be made of plastic material. The toilet body of the fixed low-water-flow toilet and the toilet body 1 of the movable toilet can alternatively be manufactured by the technology of steel sheets coated with porcelain enamel. The bottle cover communicating vessel can be made of common carbon steel pipes or plastic material.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A toilet, comprising:
   a) a toilet body (1) comprising a lifting handle (10);
   b) a funnel (2) comprising a lifting handle (7);
   c) a floating ball comprising a pull wire (3) and a pull ring (4);
   d) a toilet seat (5) comprising a rotating shaft (6);
   e) an upper cover (8) comprising a rotating shaft (9);
   f) a fender cover (15);
   g) a nut (16) of the rotating shaft of the toilet seat; and
   h) a nut (17) of the rotating shaft of the upper cover;
   wherein
   an upper end of the toilet body (1) is provided with an inner water sealing trap (11) of the toilet body and an outer water sealing trap (12) of the toilet body, a rotating groove which is protruded inwards and matches with two ends of the rotating shaft (6) of the toilet seat is arranged on one end of an inner side of the inner water sealing trap (11), a top face of the rotating groove has a same height as the top face of the outer water sealing trap (12), a lower end of the rotating groove is connected with a bottom part of the inner water sealing trap (11) to be as a whole;
   a position where a vertical face of an upper end outside the outer water sealing trap (12) is adjacent to the rotating groove matching with two ends of the rotating shaft (6) of the toilet seat is provided with a rotating groove which is protruded outwards and matches with two ends of the rotating shaft (9) of the upper cover, a top face of the rotating groove has the same height as the top face of the outer water sealing trap (12), and a bottom face of the rotating groove is even with the plane of the upper cover (8) below the rotating shaft (9) of the upper cover when the upper cover (8) is closed;

two through holes (13) are opened on the toilet body (1) at a left lower side of the rotating shaft (6) of the toilet seat, two through holes (14) are arranged on the toilet body (1) below the rotating shaft (9) of the upper cover, and two sides of the upper part of the toilet body (1) are provided with two through holes and equipped with the lifting handle (10) of the toilet body;

the upper end of the toilet body (1) is sleeved with the funnel (2), the funnel (2) is lowered gradually from an inner wall of the toilet body (1) to a lower exit of the funnel (2), an inner space of the funnel (2) exit is a truncated cone having a bigger upper and small lower, which has slope, and a top face of the funnel (2) sleeved on the inner wall of the toilet body (1) has the same height as the top face of the outer water sealing trap (12), and an outer edge of an upper end of the funnel (2) is sleeved in the inner water sealing trap (11) and closed by water stored in the inner water sealing trap (11);

the lifting handle (7) of the funnel is put in the inner water sealing trap (11);

a diameter of the floating ball is larger than an inner diameter of an end of the lower exit of the funnel (2), the floating ball arranged at the lower exit inside the funnel (2) is in an empty structure, a top part of the floating ball is provided with a lifting lug to which a nylon pull wire is tied, the nylon pull wire runs through the top face of the funnel (2) and the top face of the outer water sealing trap (12), another end of the nylon pull wire is tied with the pull ring (4) of the floating ball which has a smaller weight than that of the floating ball connected with the pull wire, and the pull ring (4) of the floating ball connected with the pull wire is suspended below the outer water sealing trap (12);

the lower exit of the funnel (2) is positioned at a lowest position of the funnel (2), and under the traction of the pull wire, the floating ball will surely fall back to the lower exit of the funnel (2) every time when the floating ball floats;

the toilet seat (5) is covered on a top of the inner water sealing trap (11), the rotating shaft (6) of the toilet seat matching with the toilet seat (5) is fixed in the rotating groove of the rotating shaft (6) of the toilet seat by the nut (16) of the rotating shaft of the toilet seat at two ends of the rotating shaft (6) of the toilet seat, a nylon wire runs through two through holes (13) arranged on the toilet body (1) at the left lower side of the rotating shaft (6) of the toilet seat to tighten two ends of the rotating shaft (6) of the toilet seat for a second fixing;

the upper cover (8) is covered on a top part of the toilet seat (5), the rotating shaft (9) of the upper cover matching with the upper cover (8) is fixed in the rotating groove of the rotating shaft (9) of the upper cover by the nut (17) of the rotating shaft of the upper cover at two ends of the rotating shaft (9) of the upper cover, a nylon wire runs through two through holes (14) arranged on the toilet body (1) below the rotating shaft (9) of the upper cover to tighten two ends of the rotating shaft (9) of the upper cover for a second fixing;

a plastic fender cover (15) is semi-circular, and covers the inner water sealing trap (11) of the toilet body and the outer water sealing trap (12) at one end of the toilet body (1); the fender cover (15) is provided with a slot having a slope and a shape matching with those of the upper part of the toilet body (1), the plastic fender cover (15) is sleeved on the opposite of the rotating shaft (9) of the upper cover, and firmly pushing the fender cover (15) can result in tight connection between the fender cover (15) and a contact face of the upper part of the toilet body (1);

the top part of the funnel (2) sleeved on the toilet body (1) and an inner upper edge aperture of the outer water sealing trap (12) of the toilet body is a main supporting part when the toilet seat (5) is stressed, the rotating groove and the nut (16) of the rotating shaft of the toilet seat matching with the two ends of the rotating shaft (6) of the toilet seat plays a role of partial supporting when the toilet seat (5) is stressed;

the toilet seat (5) rotating around the rotating shaft (6) of the toilet seat as an axis rotates from a horizontal state to a vertical state freely, and is limited to move toward other directions except for the movement from the horizontal state to the vertical state;

the upper cover (8) rotating around the rotating shaft (9) of the upper cover as an axis is freely opened or closed as required when rotating from the horizontal state to the vertical state; and an included angle of the upper cover (8) formed by a plane below the rotating shaft (9) of the upper cover and the adjacent vertical face outside the outer water sealing trap (12) is a fillet, a circle center of the fillet is a circle center of the rotating shaft (9) of the upper cover, and an arc of the radial of the fillet is tangent to the included angle, a cover edge of the upper cover (8) at a position where the cover edge of the upper cover (8) protruded downwards has a shortest distance from the rotating shaft (9) of the upper cover does not touch two walls of the inner side of the outer water sealing trap (12) during rotation of the upper cover (8), and other parts of the cover edge of the upper over can be smoothly inserted into the outer water sealing trap (12) due to the increase of the rotation radial of the cover edge of the upper cover (8) of the other parts, when the upper cover (8) stays in a closed state, the cover edge of the upper cover protruded downwards is inserted into the outer water sealing trap (12) and sealed by water stored in the outer water sealing trap (12).

2. The toilet of claim 1, wherein the toilet body (1) is made of stainless steel sheets.

3. The toilet of claim 1, wherein the toilet body (1) is manufactured by steel sheets coated with porcelain enamel.

4. The toilet of claim 1, wherein the floating ball is made of glass.

5. The toilet of claim 1, wherein the toilet has the structural characteristics of the toilet body (1), the funnel (2), the floating ball with the pull wire (3), the pull ring (4), the toilet seat (5), the rotating shaft (6) of the toilet seat, the upper cover (8), the rotating shaft (9) of the upper cover, the nut (16) of rotating shaft of toilet seat, and the nut (17) of rotating shaft of upper cover;

a fixed toilet is designed according to the structural characteristics and the tight fit mode, a lower exit of the conventional fixed toilet is changed into a circular lower exit, the inner space of the exit is a truncated cone with a big upper and a small lower and has slope, the vertex of the water sealing trap of the conventional toilet is designed at the position when the floating ball matches with the circular lower exit, and the highest level of water stored in the toilet water sealing bend should be lower than the lowest point of the floating ball when the floating toilet matches with the lower exit of the toilet to guarantee the water sealing between the floating ball and the lower exit;

the upper end of the traditional toilet is additionally provided with a water sealing trap matching with the cover edge of the upper cover, a rotating groove matching with the rotating shaft (9) of the upper cover is arranged outside the water sealing trap, and a rotating groove matching with the rotating shaft (6) of the toilet seat is arranged at the position in the toilet upper cover adjacent to the rotating shaft (9) of the upper cover;

the pull wire (3), the pull ring (4), the toilet seat (5), the rotating shaft (6) of the toilet seat, the nut (16) of the rotating shaft of the toilet seat, the upper cover (8), the rotating shaft (9) of the upper cover, and the nut (17) of the rotating shaft of the upper cover match with the toilet body of the improved fixed toilet;

when the improved fixed toilet stays in the closed state, the protruded-downwards cover edge of the toilet upper cover on the toilet seat is inserted into the toilet water sealing trap and sealed by water stored in the water sealing trap; and the toilet upper and the toilet seat can be opened and closed freely when rotating from the horizontal state to the vertical state, and the toilet body of the improved fixed toilet is still made of porcelain material or hard plastic material.

6. A urinal, comprising:
a) a urine storage bottle (18) made of plastic material and comprising an upper cover (23);
b) a bottle mouth communicating vessel (19);
c) a funnel having a water sealing trap (20); and
d) a floating ball with a pull wire and a pull ring (21);
wherein the urine storage bottle (18) is arranged in a lower part, the bottle mouth communicating vessel (19) connects the urine storage bottle (18) with the funnel having the water sealing trap (20), and an upper part of the funnel having the water sealing trap (20) is made into an upper semicircular opening and a lower semicircular opening having different heights and with the central line of the funnel having the water sealing trap (20) as the boundary;

the integral bottle mouth communicating vessel (19) is a vertically-through sleeve pipe, two ends of an inner wall of the sleeve pipe are provided with internal threads, two ends of an inner middle position of the sleeve pipe are provided with sealing grooves matching with the bottle mouth, the funnel having the water sealing trap (20) and an outer side of the bottle mouth of the urine storage bottle (18) are provided with external threads matching with the bottle mouth communicating vessel (19), and an end face of the bottle mouth is inserted into the sealing groove to be in non-leakage connection with the bottle mouth communicating vessel (19) after the bottle mouth communicating vessel (19) is screwed tightly with the bottle mouth;

the floating ball with the pull ring and pull wire (21) has a larger diameter than an inner diameter of the bottle mouth communicating vessel (19) for water passing through, and a nylon pull wire connects the floating ball and the pull ring of the floating ball, the floating ball arranged at a lower exit inside the funnel having a water sealing trap (20) is in a hollow structure, a top part of the floating ball is provided with a lifting lug and tied with a nylon pull wire; the nylon pull wire runs across a top face of the water sealing trap at an upper end of the funnel having a water sealing trap (20), another end of the nylon pull wire is tied with the pull ring of the floating ball which has a smaller weight than that of the floating ball, the pull ring is suspended below the water sealing trap of the funnel having the water sealing trap (20); and the cover edge of the upper cover (23) of the urine storage bottle is inserted into the water sealing trap of the funnel having a water sealing trap (20) and sealed by water stored in the water sealing trap.

7. The urinal of claim 6, wherein
the bottle cover communicating vessel comprises a vertically-through sleeve pipe with an internal thread at one end and a vertically-through sleeve pipe with an external thread at one end matching with the thread of the internal thread sleeve pipe, the sleeve pipes are made of carbon steel pipe or plastic materials;

the internal thread sleeve pipe has the same outer diameter as that of the unthreaded part of the external thread sleeve pipe;

the unthreaded ends of the internal thread sleeve pipe and the external thread sleeve pipe are provided with two through holes respectively for tightening the bottle cover communicating vessel;

the central positions of two common plastic bottle covers are made into two round holes with the same outer diameters as the thread of the external thread sleeve pipe, and with the two bottle cover planes attached to each other, the two bottle covers are sleeved on the external thread sleeve pipe of the bottle cover communicating vessel, and after the internal thread sleeve pipe is coordinately tightened with the external thread sleeve pipe, both the bottle covers sleeved on the external thread sleeve pipe are tightly connected under the pressure of the end face of the internal thread sleeve pipe and the end face of the unthreaded middle protrusion of the external thread sleeve; and the combined body can replace the bottle mouth communicating vessel (19) to connect the urine storage bottle (18) and the funnel having the water sealing trap (20).

8. A urinal, comprising:
a) a urine storage bottle (18) made of plastic material and comprising an upper cover (23);
b) a funnel having a water sealing trap (20); and
c) a floating ball with a pull wire and a pull ring (21);
wherein the funnel having the water sealing trap (20) and the urine storage bottle (18) are processed into a combined part (22), the upper part of the water sealing trap of the combined part (22) of the funnel having a water sealing trap and the urine storage bottle is made into an upper semicircular opening and a lower semicircular opening having different heights and with the central line of the combined part as the boundary;

the diameter of the floating ball with the pull ring and pull wire (21) is larger than the inner diameter of the bottle mouth part of the combined part (22) of the funnel having a water sealing trap and the urine storage bottle, and the nylon pull wire connects the floating ball and the floating pull ring, the floating ball arranged at the upper end of the bottle mouth part of the combined part (22) of the funnel having a water sealing trap and the urine storage bottle is in a hollow structure, the floating ball can be made of glass, and the top part of the floating ball is provided with a lifting lug and tied with the nylon pull wire, the nylon pull wire runs across the top face of the water sealing trap in the combined part (22) of the funnel having a water sealing trap and the urine storage bottle, the other end of the nylon pull ring is tied with the floating pull ring which has smaller weight than that of the floating ball, and the pull ring is suspended below the water sealing trap of the combined part of the funnel having a water sealing trap and the urine storage bottle; and the cover edge of the upper cover (23) of the urine storage bottle is inserted into the water sealing trap of the combined part (22) of the funnel and the urine storage bottle and sealed by water stored in the water sealing trap.

* * * * *